United States Patent [19]

Davis et al.

[11] 4,380,346

[45] Apr. 19, 1983

[54] METHOD OF AND APPARATUS FOR SPEEDING THE RESPONSE OF AN AIR BAG INFLATOR AT LOW TEMPERATURES

[75] Inventors: Leland E. Davis, Brigham City; David P. Dahle, Logan; Fred E. Schneiter, North Ogden; George F. Kirchoff, Brigham City, all of Utah

[73] Assignee: Thiokol Corporation, Newtown, Pa.

[21] Appl. No.: 257,285

[22] Filed: Apr. 24, 1981

[51] Int. Cl.³ .............................................. B60R 21/08
[52] U.S. Cl. ...................................... 280/736; 422/166
[58] Field of Search ............... 280/740, 741, 742, 737, 280/736, 735, 738; 422/166; 180/274

[56] References Cited

U.S. PATENT DOCUMENTS

| | | | |
|---|---|---|---|
| 3,532,359 | 10/1970 | Teague et al. | 280/741 |
| 3,721,456 | 3/1973 | McDonald | 280/736 |
| 3,972,545 | 8/1976 | Kirchoff et al. | 280/741 |
| 3,985,076 | 10/1976 | Schneiter et al. | 422/166 |
| 4,158,696 | 6/1979 | Wilhelm | 280/736 |
| 4,296,084 | 10/1981 | Adams et al. | 422/166 |

Primary Examiner—David M. Mitchell
Attorney, Agent, or Firm—Gerald K. White

[57] ABSTRACT

An air bag inflator for the passenger side of an automobile includes an elongated, tubular housing having a plurality of perforations in its cylindrical wall for discharging gas. Within the housing are a gas generant composition, an igniter and filtering screens. The perforations are normally sealed with 0.003 inch (0.0762 mm.) thick non-tempered aluminum foil which is easily ruptured by the gas pressure when the inflator is ignited. The foil, in addition to serving as a hermetic seal for protecting the gas generant and igniter from moisture and dust, insures that the gas pressure will reach a certain, threshold level before being discharged into an air bag. In very cold weather the inflator attains its peak pressure considerably more slowly than in warm weather. As a result, the air bag may be inflated either too slowly or insufficiently to perform its intended purpose. In order to preclude this from happening at least some of the perforations in the housing are covered with an additional or buttressing layer of thicker (0.006 inch; 0.1524 mm.) non-tempered aluminum foil, so that the threshold gas pressure necessary to rupture these seals is raised. This shortens the time for attaining peak gas pressure within the tubular housing and results in faster, more satisfactory inflation of the air bag when the ambient temperature is low.

4 Claims, 5 Drawing Figures

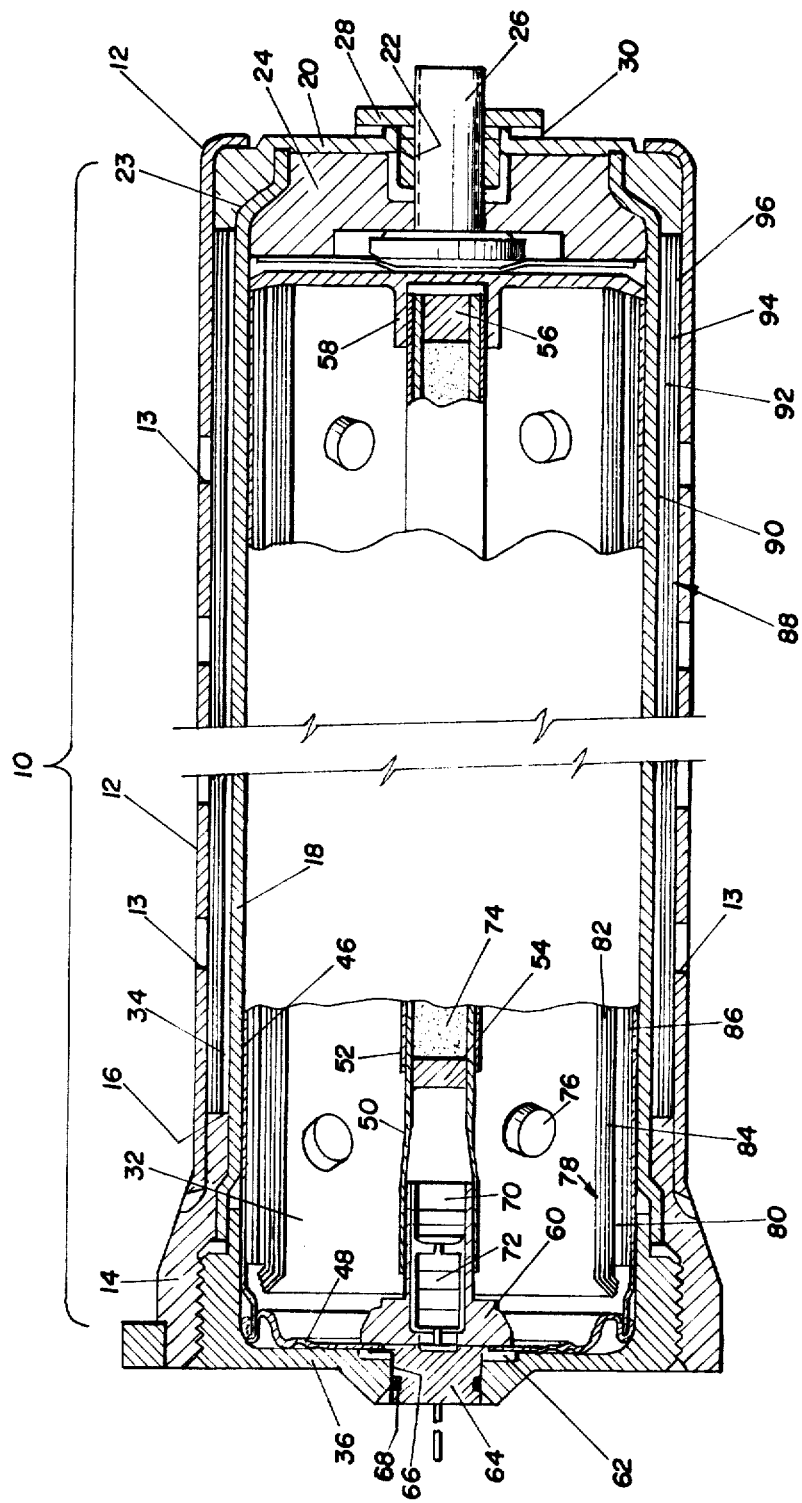

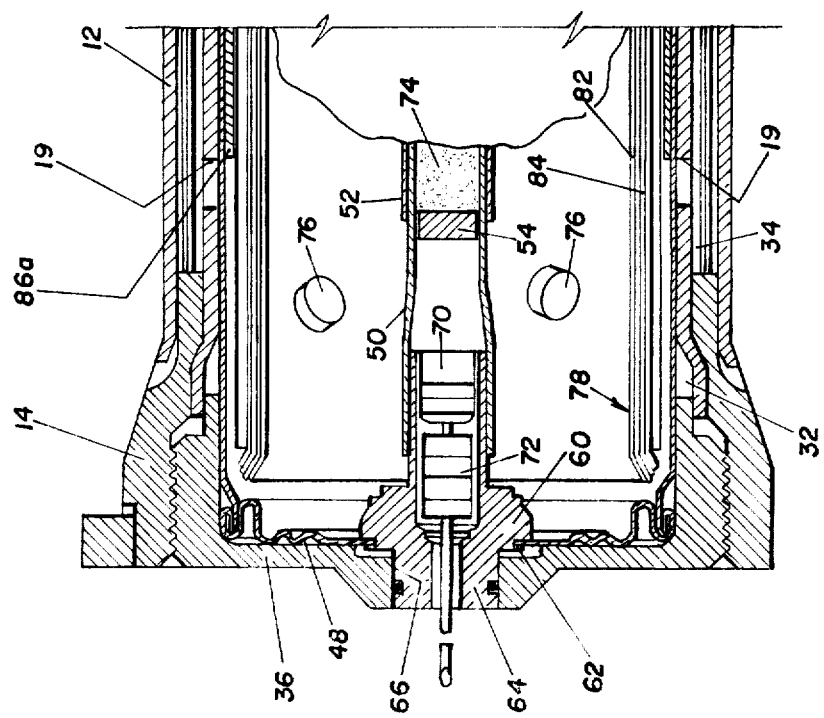
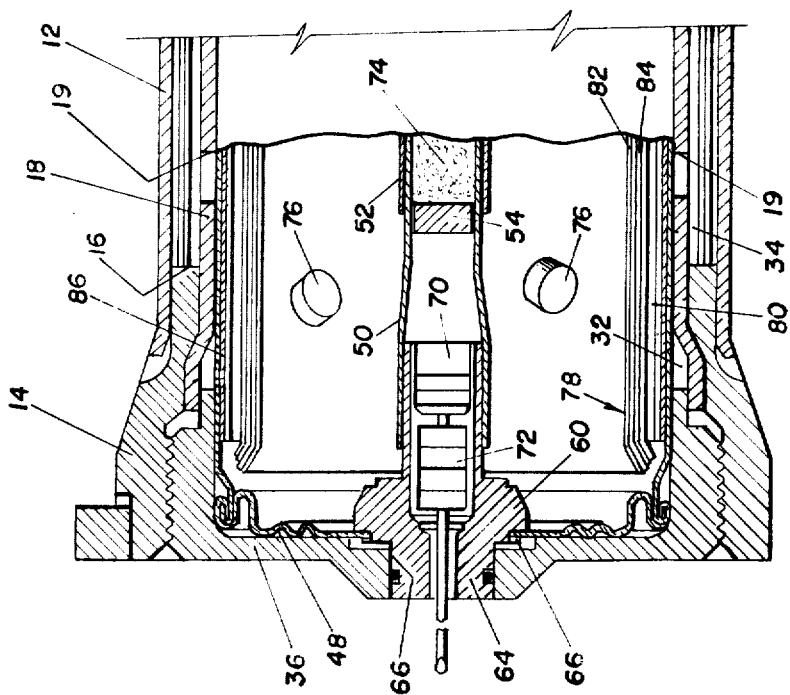

METHOD OF AND APPARATUS FOR SPEEDING THE RESPONSE OF AN AIR BAG INFLATOR AT LOW TEMPERATURES

BACKGROUND OF THE INVENTION

1. Field of the Invention

This invention relates to an improvement in vehicle air bag or cushion restraint systems, and is useful, particularly in very cold weather, in air bag inflators that are provided for the passenger side of an automobile.

2. Description of the Prior Art

Safety air bag inflators or gas generators that utilize the combustion of a solid gas generant composition for the rapid generation of clean nitrogen gas for inflating air bags are known in the prior art. One efficacious form of such inflator is disclosed in U.S. Pat. No. 4,296,084 issued on Oct. 20, 1981 on the copending application Ser. No. 88,992, filed Oct. 29, 1979 by Gary V. Adams et al wherein a separate embodiment of the invention is disclosed for each of the driver and passenger sides of an automobile or other vehicle.

The inflator for the passenger side, as disclosed in U.S. Pat. No. 4,296,084, includes an elongated tubular housing with a plurality of perforations in it for discharging gas. Within the tube are filtering screens, a gas generant and an igniter. The perforations in the tube are normally sealed with thin non-tempered, 0.003 inch (0.0762 mm.) thick, aluminum foil, which is easily ruptured by gas pressure when the inflator is ignited. This foil serves as a hermetic seal for protecting the gas generant and igniter from moisture and dust. The foil also insures that the gas pressure, in its rise to a peak value upon combustion of the gas generant, will reach a certain, threshold value before being discharged into an air bag. It has been found that, in very cold weather, this inflator attains its peak pressure considerably more slowly than in warm weather so that there is a tendency for the air bag to be inflated either too slowly or insufficiently to perform its intended purpose, with consequent discomfort or possible injury to the passenger in the vehicle who is relying upon inflation of the air bag for protection.

It is known in the art to provide multi-level gas generators or inflators for inflating the air bag with the utmost rapidity if the shock of an impact is severe and less rapidly if the shock is less severe. Such an arrangement is disclosed in U.S. Pat. No. 3,972,545 granted on Aug. 3, 1976 wherein a hermetically sealed container is divided into two parts each of which contains a gas generant material and a squib. When the shock is severe a sensing means fires both squibs simultaneously. A less severe shock causes only one of the squibs to fire. There is no provision in U.S. Pat. No. 3,972,545, however, for adjusting the response of the inflator in accordance with the ambient temperature, and specifically, for increasing the response of the inflator in very cold weather.

SUMMARY OF THE INVENTION

An object of the invention is to provide a method of and apparatus for speeding the response of an air bag inflator at low ambient temperatures, while maintaining the early breakout flow conditions offered by the single layer thin foil barrier.

In accomplishing this and other objectives of the present invention there is provided in association with the tubular housing of an air bag inflator, such as that disclosed in U.S. Pat. No. 4,296,084 mentioned above, an additional layer of non-tempered aluminum foil, preferably 0.006"(0.1524 mm.) thick, for covering some of the perforations, the double foil comprising a multiple strength barrier. The perforations with a single foil covering break at a low pressure to provide early gas flow and bag movement. The chamber perforations with the double foil, which constitute the major portion of the flow area, do not rupture until a higher threshold gas pressure is achieved. The restricted flow area during pressure buildup, and the higher resultant operating pressure in the tubular housing both contribute to faster, more satisfactory inflation of the air bag when the ambient temperature is low, as in very cold weather.

As those skilled in the art will understand, the seals for the perforations in the tubular housing are not to be restricted to aluminum foil or to foil of specific thickness. The foil can be made of any material having the required rupture strength and that does not add objectionable decomposition products to the gas being discharged into the air bag.

DESCRIPTION OF THE DRAWINGS

FIG. 1 is a sectional view of a safety air bag gas generator or inflator according to the present invention having particular utility for the passenger side of the vehicle;

FIG. 2 is an enlarged fragmented sectional view of a portion of the inflator of FIG. 1 rotated 45° on its longitudinal axis and showing in greater detail an additional layer of foil for sealing the perforations in an inner perforated tubular housing;

FIG. 3 is an enlarged fragmented sectional view of a modification of the inflator illustrated in FIGS. 1 and 2 showing an alternative location for the additional layer of foil for sealing some of the perforations in the inner perforated tubular housing;

DESCRIPTION OF THE PREFERRED EMBODIMENTS

Figure 4:
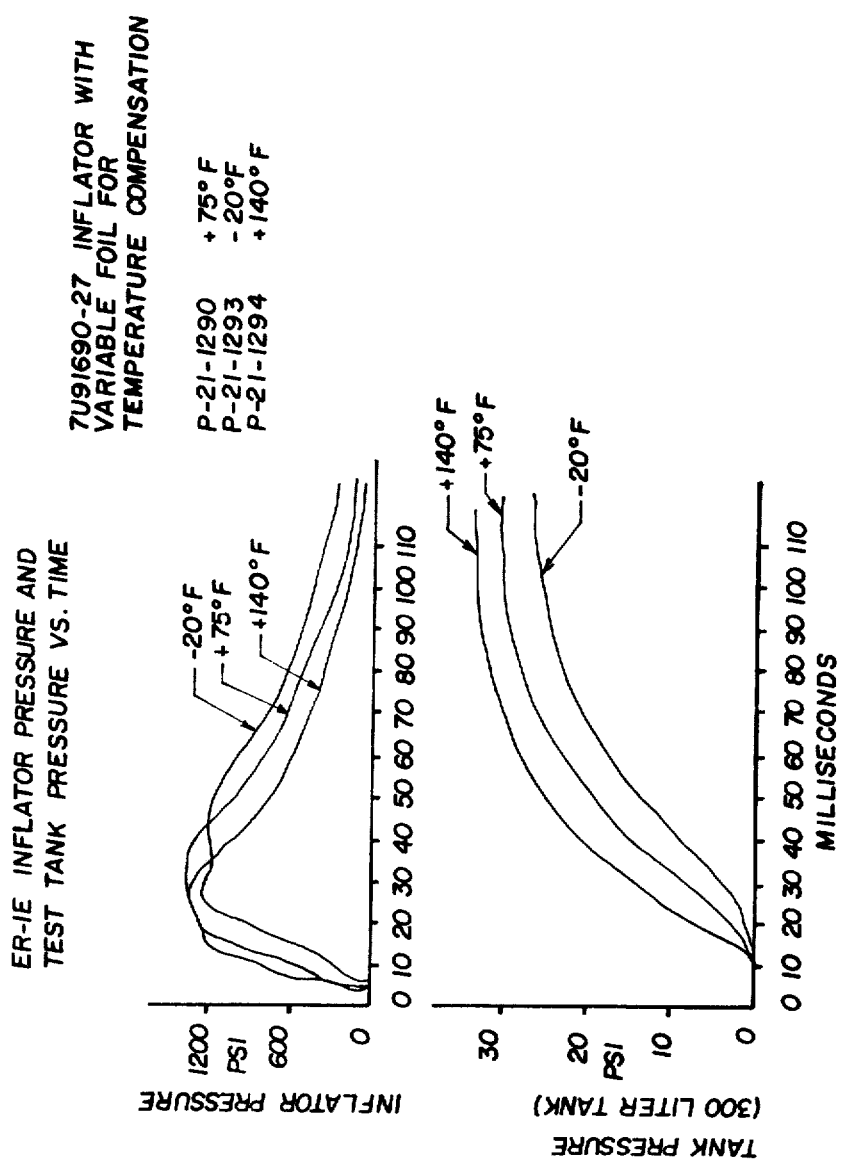
FIG. 4 graphically illustrates inflator performance at high, low, and ambient temperature operation with partial double layer of foil combustion chamber barrier for temperature compensation.

The inflator indicated at 10 in the drawing is particularly applicable for use in a vehicle cushion restraint system that includes an air bag (not shown) for use on the passenger side of a vehicle, being mounted in an appropriate manner in or on the dash board of the vehicle.

The inflator 10, as shown, is elongated, typically having a length of 21 inches (52.54 cm.) and is annular in general construction. Specifically, the inflator 10 includes an elongated perforated tubular outer housing 12 that preferably is made of carbon steel. For most of its length, the outer housing 12 has a thin cylindrical wall in which a plurality of perforations indicated at 13 are provided. At the left end, housing 12 includes a heavier diffuser flange section 14 that provides a shoulder indicated at 16. Section 14 flares radially outwardly to receive a second elongated thin tubular inner housing 18 having a plurality of perforations 19, as shown in FIG. 2, in the wall thereof, and made of carbon steel. The fragmented view of FIG. 2 shows the inflator 10 rotated 45° on its longitudinal axis thus revealing a plurality of perforations 19 that are provided in the cylindrical wall of the inner housing 18. Inner housing 18 is concentrically positioned with respect to the outer housing 12. The wall of the right end of cylindrical housing 12 is rolled radially inwardly as indicated at 23 and is provided with a stud end flange 20 having a centrally disposed opening 22 therein. The right end of inner housing 18 is provided with an inward S-shaped curl as indicated at 23. Cooperating with the right ends of housing 12 and cylindrical member 18 for firmly locking those ends together are a stud end cap 24, a weld screw 26, a nut 28 and a lockwasher 30. The stud end cap 24 fits within the right end of inner housing 18 and has a peripheral surface that matches the S-shaped curl 23 in the end of housing 18. Weld screw 26 extends through stud end cap 24 and outwardly of the stud end flange 20 to engage the nut 28 which extends partially through stud end cap 24, the lock-washer 30 being provided to firmly retain the members together for long periods notwithstanding the presence of vibration. When the weld screw 26 and nut 28 are pulled together in locking relationship, the right end of inner housing 18 is brought into tight engagement with the inner wall of stud end flange 20.

It will be noted that the interior of the inner housing 18 forms a combustion chamber 32 and that the annular space 34 between the inner housing 18 and the inner surface of outer housing 12 provides a space for additional filtration and gas diffusion.

The outer housing 12 and the flange 14 are joined by a circumferential weld. The flange 14 ends of the outer housing 12 and the inner housing 18 are closed by an end cap 36 that is threaded externally and fits inside the internally threaded flange 14. Sealant may be used in the threads to prevent leakage or tampering.

An elongated rupturable hermetically sealed cylindrical container or cartridge 46, preferably made of aluminum and having a wall thickness of 0.003 inches (0.00762 cm.), is positioned in combustion chamber 32, being disposed coaxially therewith, completely filling the chamber and being held firmly against either radial or lengthwise movement. The left end of cartridge 46 comprises an end disc 48 that is sealed by a suitable sealant to the cylindrical sidewall with a double crimp seal.

Positioned in cartridge 46 in coaxial relationship therewith is an elongated perforated cylindrical igniter tube 50 having a rupturable metal foil or igniter barrier 52 sealed to the outer wall thereof. An igniter plug 54 is provided adjacent the left end of igniter tube 50 and a separate igniter plug 56 is provided at the right end of tube 50, adjacent the right end wall of cartridge 46. As shown, the inner right end wall of cartridge 46 includes an inwardly projecting short cylindrical portion 58 for retaining the right end of igniter tube 50 in position. The left end of the igniter tube 50 is supported by an initiator body 60, that in turn passes through and is crimped to a circular opening in the cartridge end cap 48. A portion of the initiator body 64 passes through end cap 36. An "O" ring is provided to provide a moisture barrier.

A conventional electric squib 70 having suitable energizing terminals is provided in the right end portion of initiator mounting member 60, ferrite beads 72 being provided to render the squib 70 insensitive to extraneous radio frequency energy. Between the igniter plugs 54 and 56 in the igniter tube 50 is pyrotechnic material comprising igniter granules 74. Surrounding the igniter tube 50 are uniformly distributed pellets 76 of gas generant composition, which composition, in turn, is surrounded by an elongated annular primary or combustion chamber filter 78.

The primary filter 78 comprises a filter pack of three screens including one to three layers of coarse screen 80 that are adjacent the inner wall cartridge 46, one or more layers of fiberglass woven fabric or cloth 82, and multiple layers of fine mesh screen 84, preferably 40×40 mesh carbon steel. Surrounding the primary filter 78, disposed between the filter 78 and the perforated inner wall of the inner housing 18, as best seen in FIG. 2, is a cylindrical layer of non-tempered aluminum foil 86, the thickness of which preferably is 0.006 inches (0.1524 mm.). The layer of foil 86 is provided to cover at least some, and in FIGS. 1 and 2 of the drawings is shown as covering all, of the perforations 19 in the wall of the inner housing 18, thus providing a buttressing foil layer additional to the wall of cartridge 46 for sealing the perforations 19 in the inner housing 18. FIG. 3 of the drawings shows the foil layer 86 covering some only of the perforations 19, the first row of perforations 19 not being covered. Preferably, four angularly spaced rows of such perforations 19 are provided circumferentially of each of the inner housing 18 and the outer housing 12, the perforations 19 in the inner housing 18 being offset both linearly and radially from the perforations 13 in the outer housing 12.

A secondary filter 88 is located in the annular chamber 34, the diffuser region between the inner housing 18 and the outer housing 12, and comprises a coarse, 18 mesh, standoff screen 90 that surrounds the housing 18 in contact therewith, multiple wraps of coarse screen 92, one or more wraps of aluminum silicate blanket 94 that surround the coarse screen 90, and several wraps of fine 100 mesh screen 96 that are provided adjacent the inner wall of housing 12. The 18 mesh standoff screen is provided to allow the aluminum foil of cartridge 46 and of the additional layer of foil 86 to blow out of the way.

OPERATION OF THE PREFERRED EMBODIMENTS

Except for the inclusion of the additional layer of foil 86, the embodiment of the invention illustrated in FIGS. 1 and 2 of the drawings may be similar, if not identical, to the gas inflator that is disclosed in the aforementioned U.S. Pat. No. 4,296,084 for protecting the passengers in a vehicle. Accordingly, the operation of the inflator will be described herein only insofar as it pertains to the use of the additional layer 86 for sealing the perforations 19 of the inner tubular housing 18.

Upon initiation of combustion by the firing of the squib 70, the pressure of the gas generated as a result of such combustion within the cartridge 46 begins to rise and continues until a peak pressure is reached. Prior to the attainment of the peak gas pressure, however, during the combustion function time, the gas pressure reaches a threshold value at which the aluminum foil forming the wall of the cartridge 46 and the additional foil layer 86 rupture. Upon such rupture the foil layers adjacent the perforations 19 in tubular housing 18 are blown out of the way and the generated gas is allowed to flow out through the perforations into the annular diffuser space 34 between the inner tubular housing 18 and the outer tubular housing 12. After filtering by the secondary filter 88 the gas is then allowed to flow out through the perforations 13 in the outer housing 12 in the air bag to be inflated.

As noted hereinbefore, because of the provision of an additional or partial foil layer 86, the threshold level of gas pressure at which rupture of the foil layers 46 and 86 occurs is higher than when foil layer 46 only is present. The effect of this is to create a condition where more than one threshold pressure is possible, and enables the preselection of flow areas where the foil will rupture at the lower and higher pressures, the foil layers 46 and 86 comprising a multiple strength barrier.

A structure wherein all nozzle holes are covered by the second layer of foil will have a higher foil burst pressure and consequently faster operation. It is evident that this condition may be simulated by using a heavier gauge metal in the cartridge. While this approach is useful in achieving a higher threshold foil burst pressure which tends to reduce the performance variation with temperature, the longer delay in starting gas flow experienced with this design can be detrimental to certain air bag applications.

By utilization of a partial layer of foil 86a covering selected ports 19 of chamber 18, as illustrated in FIG. 3, two threshold foil burst pressures can be created to tailor inflator output to meet specific performance objectives. By selecting the wall thickness and material hardness for cartridge 46, the inflator can be made to have a low threshold foil burst pressure for a portion of the inflator and thus achieve the early breakout and bag movement so important to the out of position child. By covering the remainder of the nozzle holes 19 in chamber 18 with a second layer of foil 86a, gas flow is restricted in this area until the higher threshold foil burst pressure is achieved. The result is a faster pressure build up, higher operating pressure, faster burning, and more satisfactory operation at low temperature.

Figure 5:
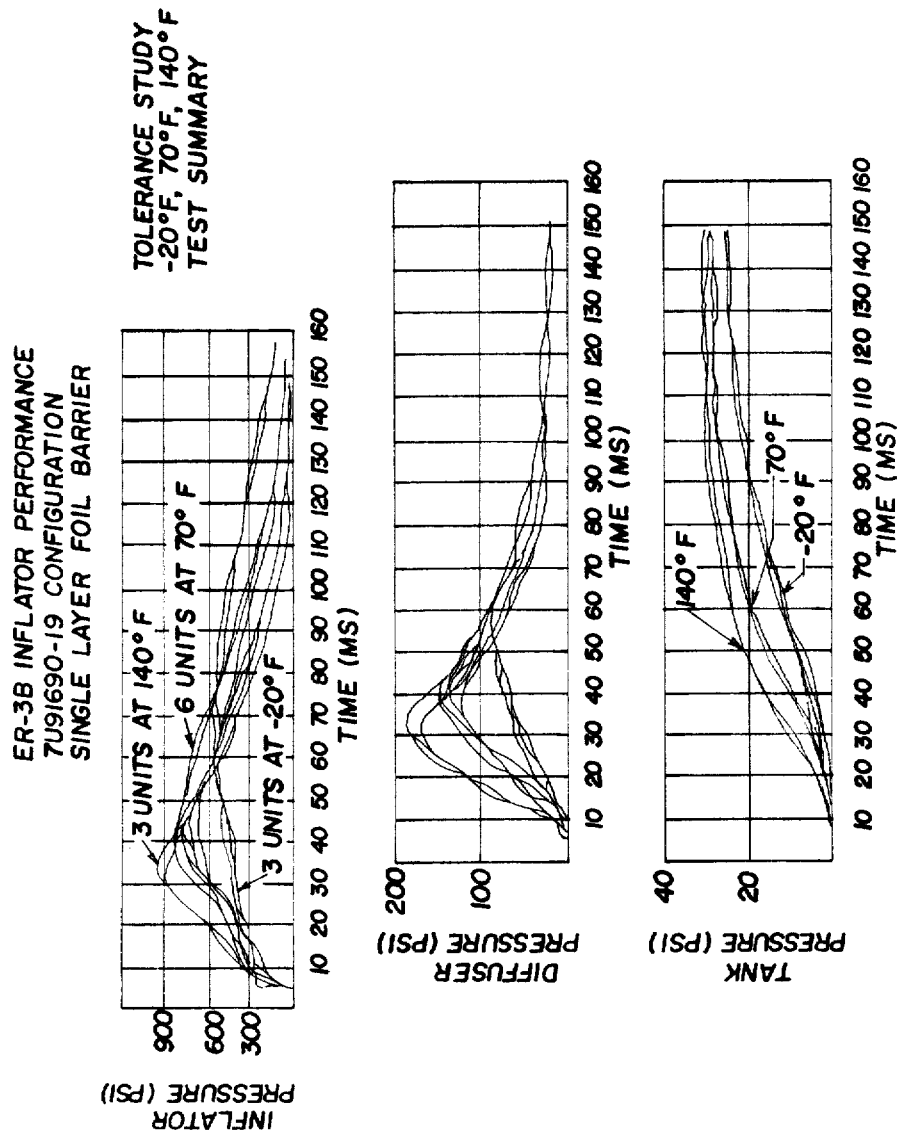
FIG. 5 graphically illustrates inflator performance at low, high, and ambient temperature with a single layer foil combustion chamber barrier.

Application of this temperature compensating variable foil or multiple strength barrier causes the inflator to operate at nearly constant maximum pressure over the operating temperature range of $-20°$ F. to $+140°$ F. This is illustrated in the inflator performance data shown in FIG. 4. Inflator performance data without the temperature compensating variable foil is shown in FIG. 5.

Thus there has been provided according to the present invention, an improved method for tailoring the response of an air bag inflator by providing early gas flow which is characteristic of soft inflation and providing a high secondary threshold pressure to assure rapid pressure build up and improved low temperature operating characteristics.

What is claimed is:

1. In a method for inflating an air bag comprising, igniting combustible gas generant material in a sealed housing having walls that rupture when the pressure of the generated gas, in the rise thereof to a peak value, reaches a certain threshold value that is lower than the peak value, filtering the generated gas, and discharging the filtered gas to the air bag to be inflated, the generation of gas within the housing being characterized in that the rise in pressure to the peak value tends to be attained more slowly when the ambient temperature is low so that the air bag then may be inflated too slowly or insufficiently to perform its intended purpose, the improvement comprising the use of a multiple strength barrier to allow selected areas of the walls of the sealed housing to rupture at a low threshold pressure early in the event to provide gas flow for early bag movement and delaying the rupture of the walls of the sealed chamber in other areas until the pressure of the generated gas therein reaches a predetermined value, restriction of the major inflator flow area during pressure build up having only a minor impact on inflator function during normal or high ambient temperature operation but having the effect of greatly increasing the rate of pressure build up at low ambient temperature operation when pressure buildup would normally be slow.

2. In an inflator for an air bag comprising housing means having wall means that define a combustion chamber, said wall means having gas discharge perforations formed therein and including rupturable means for normally sealing said perforations, a combustible gas generant composition disposed in said combustion chamber, said composition being operable upon ignitition to produce gas and combustion products, the generation of gas within said housing being characterized in that the rise in pressure to a peak value tends to be slowed when the ambient temperature is low, said rupturable means of said wall means of said housing rupturing upon the attainment of a certain threshold value that is less than said peak value, means for filtering the generated gas, and means for discharging the filtered gas to an air bag, the improvement comprising means buttressing said rupturable means to delay the rupture thereof unitl the pressure of the generated gas therein reaches a predetermined value that is higher than the certain threshold value thereby to shorten the time for attaining the peak gas pressure value within the combustion chamber, and resulting in faster, more satisfactory generation of gas and inflation of the air bag when the ambient temperature is low and the rate of gas generation tends to be slowed, said means for buttressing said rupturable means comprising a layer of foil, said layer of foil buttressing said rupturable means with respect to some only of said perforations.

3. In an inflator as specified in claim 2 wherein said rupturable means comprises the wall of a hermetically sealed cartridge that is positioned within said housing means, said layer of foil being disposed in contacting relation with the wall of said cartridge.

4. In an inflator as specified in claim 3 wherein said housing means is an elongated tubular housing and said cartridge is similarly elongated and tubular, and wherein said layer of foil is disposed in contacting relation with the wall of said cartridge internally thereof.

* * * * *